United States Patent
Niakan et al.

(10) Patent No.: US 10,532,304 B2
(45) Date of Patent: *Jan. 14, 2020

(54) INTERFACE AIR FILTER AND ASSEMBLY

(71) Applicant: Advanced Flow Engineering, Inc., Corona, CA (US)

(72) Inventors: Shahriar Nick Niakan, Anaheim Hills, CA (US); Christian Luc Landel, Corona, CA (US)

(73) Assignee: Advanced Flow Engineering, Inc., Corona, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/351,316

(22) Filed: Mar. 12, 2019

(65) Prior Publication Data

US 2019/0209956 A1  Jul. 11, 2019

Related U.S. Application Data

(63) Continuation of application No. 14/999,710, filed on Jun. 17, 2016, now Pat. No. 10,252,202, which is a
(Continued)

(51) Int. Cl.
*B01D 46/00* (2006.01)
*F16L 21/00* (2006.01)
(Continued)

(52) U.S. Cl.
CPC ..... *B01D 46/0002* (2013.01); *B01D 46/0005* (2013.01); *B01D 46/2411* (2013.01);
(Continued)

(58) Field of Classification Search
CPC ............ B01D 46/0002; B01D 46/2411; B01D 46/0005; B01D 2279/60; B01D 2275/201;
(Continued)

(56) References Cited

U.S. PATENT DOCUMENTS 3,090,490 A   5/1963  Yocum
3,572,014 A   3/1971  Hansen
(Continued)

OTHER PUBLICATIONS

International Search Report and Written Opinion, PCT Application No. PCT/US13/00243, dated Mar. 13, 2014.

*Primary Examiner* — Minh Chau T Pham
(74) *Attorney, Agent, or Firm* — Ravi Mohan; Rutan & Tucker, LLP

(57) ABSTRACT

An interface air filter and assembly for use with an internal combustion engine is disclosed. The assembly has a housing having an air intake port and an opening. There is an air filter assembly with an air filter having a closed end and an open end and a reducing coupling. The reducing coupling has a first end with a first engaging member having an external circumference and outer surface, a second end with a second engaging member having an external circumference less than the first engaging member external circumference, and the second engaging member has an inner surface. The first end of the reducing coupling is attached to the open end of the air filter. The air filter assembly is in contact with the housing such that the air filter resides within the housing and the outer surface of the first engaging member engages the housing. The inner surface of the second engaging member is adapted to contact an air intake tube outer surface so that air can pass from the air intake port into the housing then through the air filter and into the air intake tube.

6 Claims, 6 Drawing Sheets

Related U.S. Application Data continuation of application No. 13/694,159, filed on Nov. 1, 2012, now Pat. No. 9,440,175.

(51) Int. Cl.
  *B01D 46/24* (2006.01)
  *F02M 35/02* (2006.01)
  *F02M 35/024* (2006.01)

(52) U.S. Cl.
  CPC .... *F02M 35/0201* (2013.01); *F02M 35/0202* (2013.01); *F02M 35/02475* (2013.01); *F16L 21/002* (2013.01); *B01D 2275/201* (2013.01); *B01D 2279/60* (2013.01)

(58) Field of Classification Search
  CPC .......... F02M 35/02475; F02M 35/0202; F16L 21/002
  USPC ................ 55/385.3, 498, 510, 357; 95/273; 96/134, 135, 147, 154; 123/198 E, 518
  See application file for complete search history.

(56) References Cited

U.S. PATENT DOCUMENTS

| | | | |
|---|---|---|---|
| 3,747,303 A | | 7/1973 | Jordan |
| 4,259,096 A | | 3/1981 | Nakamura et al. |
| 4,279,630 A | | 7/1981 | Nakamura et al. |
| 4,314,832 A | | 2/1982 | Fox |
| 4,322,230 A | | 3/1982 | Schoen et al. |
| 4,826,517 A | | 5/1989 | Norman |
| 5,275,636 A | * | 1/1994 | Dudley .............. B01D 46/0005 55/385.3 |
| 5,487,767 A | * | 1/1996 | Brown .............. B01D 46/0024 55/357 |
| 6,152,996 A | | 11/2000 | Linnersten et al. |
| 6,811,588 B2 | | 11/2004 | Niakin |
| 7,645,329 B2 | | 1/2010 | Niakan et al. |
| 9,440,175 B2 | * | 9/2016 | Niakan .............. B01D 46/2411 |
| 2006/0107836 A1 | | 5/2006 | Maier et al. |
| 2006/0260469 A1 | * | 11/2006 | Miyagishima ..... B01D 46/0005 95/273 |
| 2008/0060524 A1 | | 3/2008 | Tumbrink et al. |

* cited by examiner

INTERFACE AIR FILTER AND ASSEMBLY

The present application is a continuation of and claims the benefit of priority to U.S. application Ser. No. 14/999,710, filed Jun. 17, 2016, now U.S. Pat. No. 10,252,202, which is a continuation of U.S. application Ser. No. 13/694,159, filed Nov. 1, 2012, now U.S. Pat. No. 9,440,175, the entire contents of which are herewith incorporated by reference.

FIELD OF THE INVENTION

This invention generally relates to interfaces and housing for an air filter for use with an internal combustion engine.

BACKGROUND OF THE INVENTION

Historically, the primary task of an air filter has been to reduce the amount of particulate matter that might normally enter into an internal combustion engine. Even small abrasive particles could cause significant damage to an internal combustion engine resulting in expensive repairs.

In practice, unfiltered air is directed through the filter, which is often a material chosen for its ability to capture particles of particular range of sizes. The air then exits the filter and is directed into the engine.

There immerged numerous types of filters. Some were dry filters while others used oil to absorb particles. The geometries of the filters also varied to increase the surface areas of the filter without impacting the size of the filter.

However, with all these developments usually the filters were placed in close proximity to the internal combustion engine. This resulted in the air entering the filter being directed into the engine compartment of the vehicle. As the engine gave off heat as a by-product, the intake air became hotter than the outside ambient air.

It was discovered that if the intake air were cooler than the temperature in the engine compartment, then engine efficiency increased. This phenomenon has been credited by many to the application of the ideal gas equation.

Per the equation, temperature and volume of a gas are directly related. As the temperature drops the volume of the air decreases resulting in an increase in the density of the air.

In relation to an internal combustion engine, the increased density provides more Oxygen to combine with the hydrocarbon fuel and therefore a more efficient burn.

There arose a number of approaches to reduce the temperature of the intake air. This proved to be a challenge since the filter systems were in such close relation to the engine.

One approach was to separate the air filter assembly from the rest of the engine compartment. This is usually done with a barrier such as a wall or box type enclosure around the air filter. FIG. 1 shows one such enclosure. The filter apparatus 10 has a housing 15 and a cover 29 that encloses a filter. The air is drawn into the housing through the input opening 20. Once the air is filtered, the air is directed through the housing to an air inlet tube 25 then to the engine.

This configuration exemplifies a case where there is a channel 23 incorporated as part of the cover that focuses the air flow into the air inlet tube 25. Other units interface with the air inlet tube by having the tube pass through a wall or barrier of the housing and extending into the housing before coming into contact with the air filter. These cases are generally less expensive, but also allow for heat transference through the interface between the air inlet tube and the housing.

This approach requires screws 27 and other parts such as a separated wall to create the enclosure. Furthermore, it is evident that the filter must be fitted into the enclosure before being sealed with the wall and screws. This requires time and effort and reduces the efficiency to install and maintain the filter system.

FIG. 2 identifies another assembly with another type of housing. This filter assembly 30 has the filter 35 separated from the engine compartment by a housing 40 that is not completely enclosed as in FIG. 1. While this unit does not require as much work to install and maintain as the system in FIG. 1, the unit in FIG. 2 is not as efficient in isolating the filter from the heat of the engine. This is due to the partial enclosure. The hood of the vehicle covers the top of the filter assembly. That contact is not as efficient as a full enclosure.

The configuration also requires the air inlet tube 45 to extend into the housing and connect with the filter 35. This allows for heat to enter through that input point.

Turning to FIG. 3, the air inlet tube 50 connects to the filter 55 by way of a connection point 60. This is a typical configuration for a system where the air filter is within a housing. Such an arrangement requires an interface between the air inlet tube and the housing.

The connection between the air inlet tube and the housing is also apparent in FIG. 4. In this figure the air inlet tube 65 extends through the housing 70. That intersection allows for heat transference. Heat enters the assembly even though the tube 65 is connected 75 to the filter 80.

Also apparent in each of the figures is that the bends in the tube creates turbulence, which can reduce the efficiency of the air flow to the engine.

What is needed is an interface air filter housing that filters ambient air, reduces heat dissipation between the air inlet tube and the housing, while being simple to install and maintain.

SUMMARY OF THE INVENTION

In accordance with the present disclosure, an interface air filter for use with an internal combustion engine is provided. The interface air filter has an air filter with a closed end and an open end and a reducing coupling. The reducing coupling has a first end with a first engaging member having an external circumference and outer surface, a second end with a second engaging member having an external circumference less than the first engaging member external circumference, and the second engaging member has an inner surface. The first end of the reducing coupling is attached to the open end of the air filter.

The outer surface of the first engaging member is adapted to contact a housing. The filter would then reside within the housing.

The inner surface of the second engaging member is adapted to contact an air intake tube outer surface so that air can pass through the housing then through the air filter and into the air intake tube.

BRIEF DESCRIPTION OF THE DRAWINGS

The invention is generally shown by way of reference to the accompanying drawings in which.

DETAILED DESCRIPTION OF THE INVENTION

Figure 1:
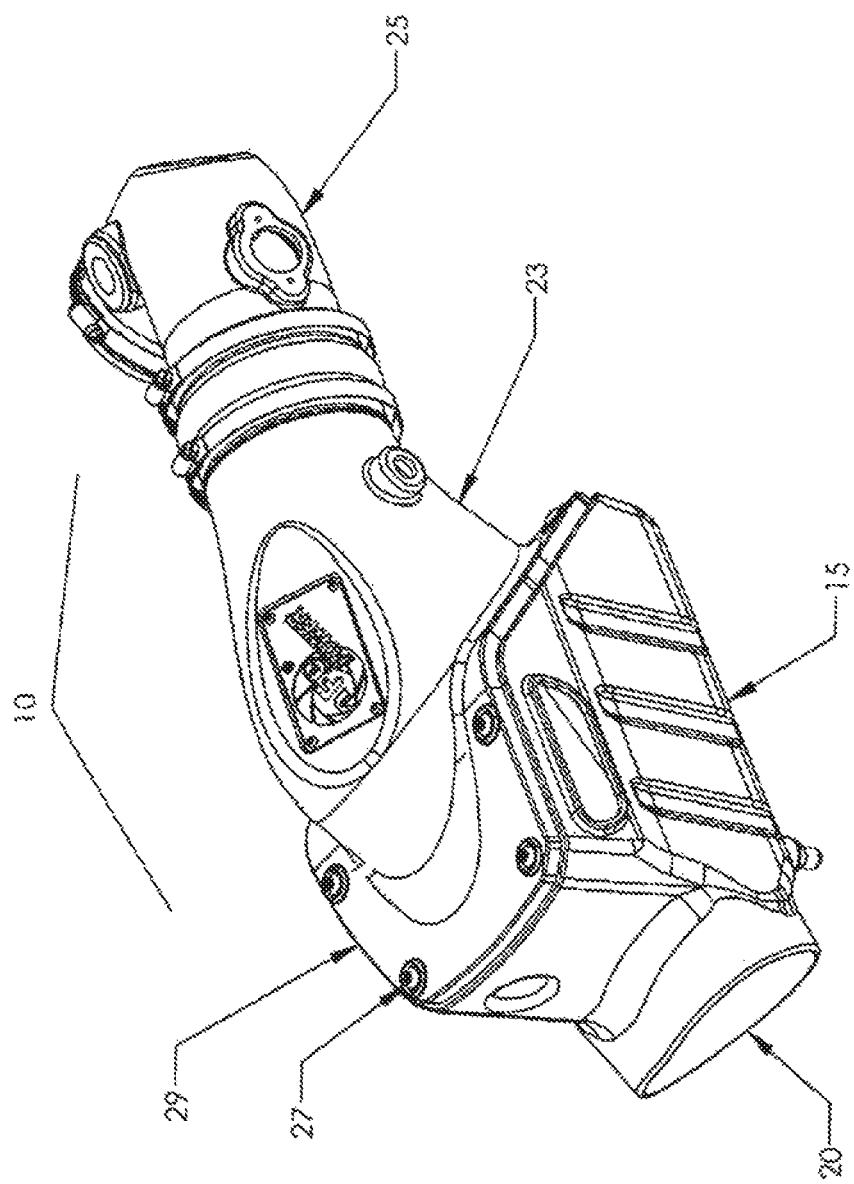
FIG. 1 is a perspective view of an air filter assembly with an enclosed housing.
Figure 2:
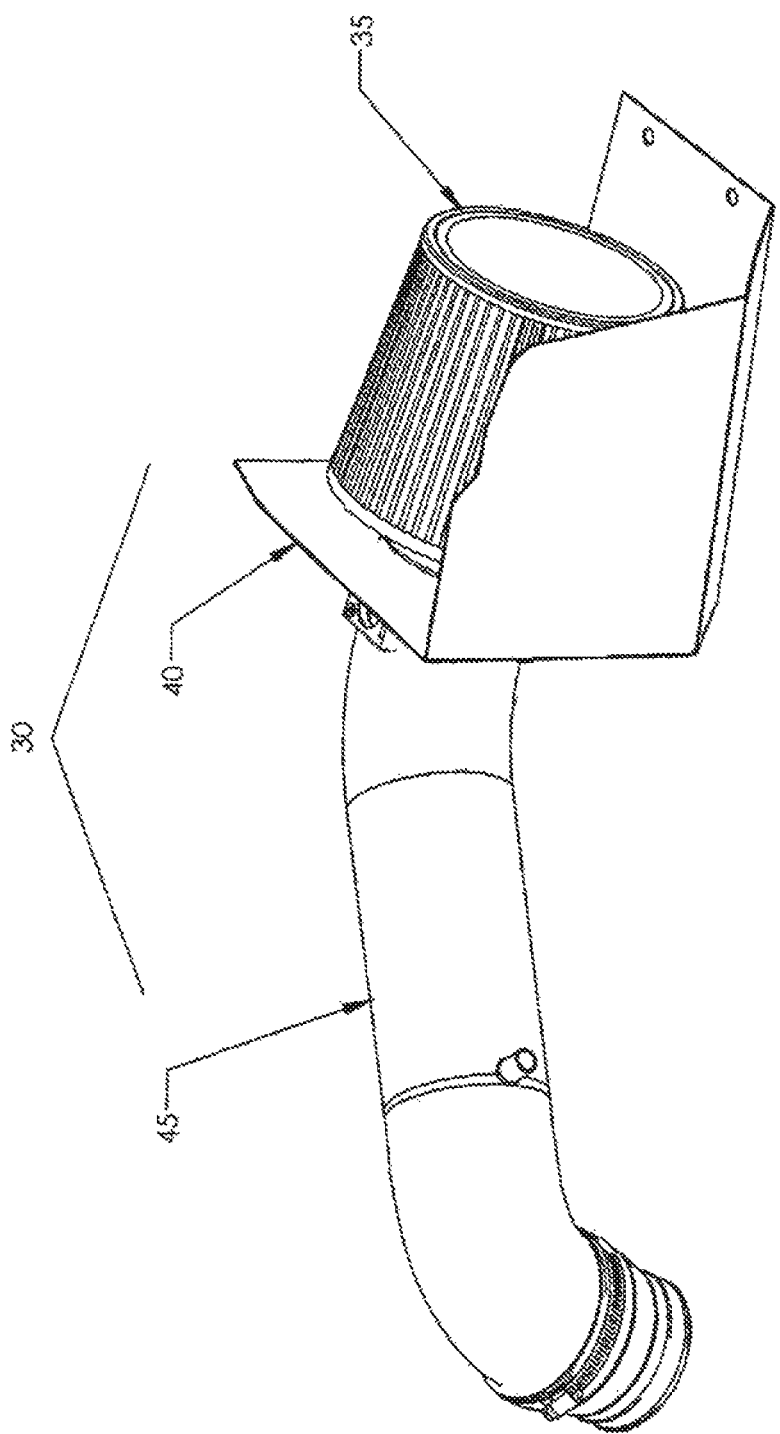
FIG. 2 is a perspective view of an air filter assembly with an open housing.
Figure 3:
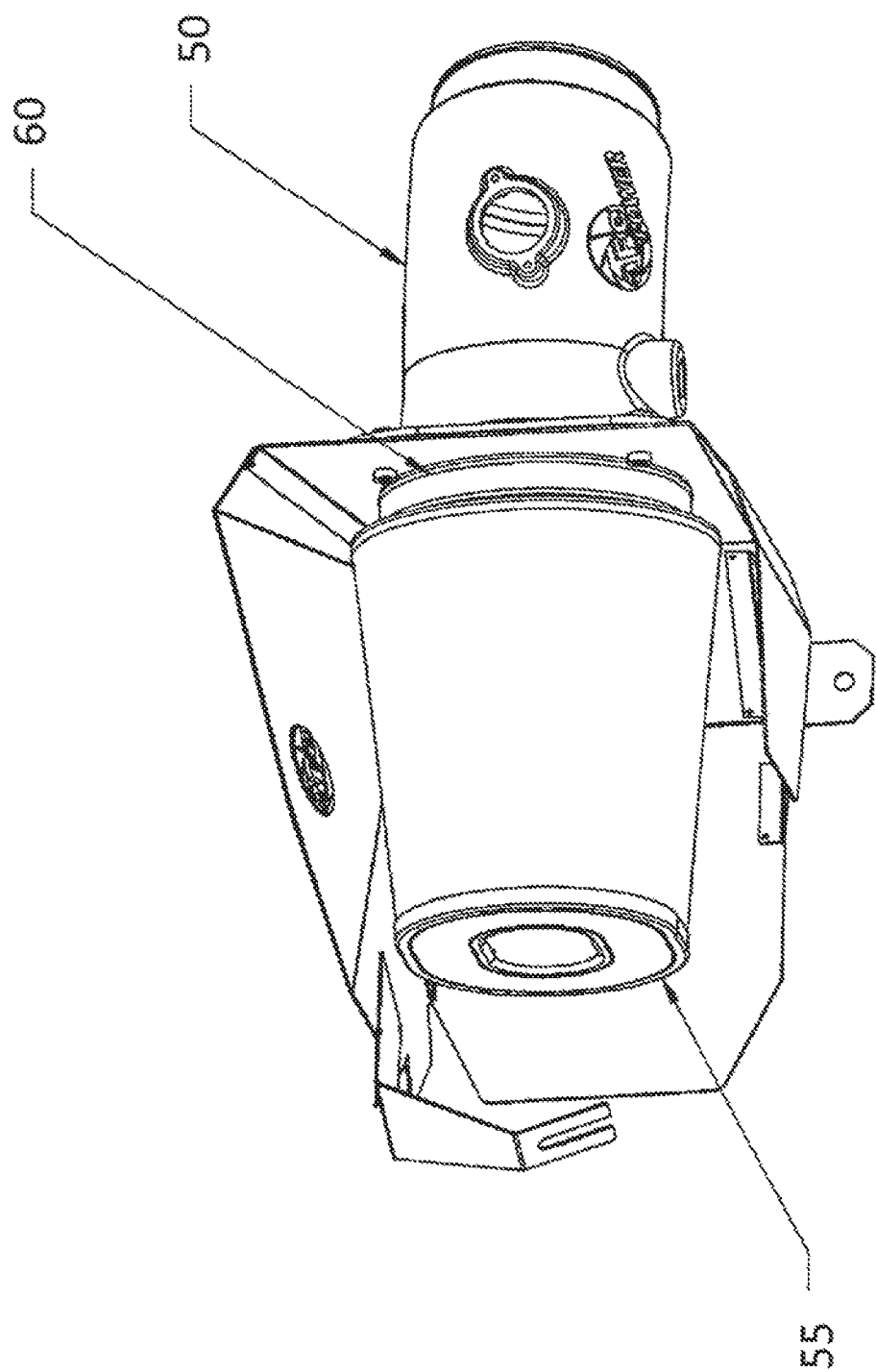
FIG. 3 is a perspective view of another air filter assembly with an open housing.
Figure 4:
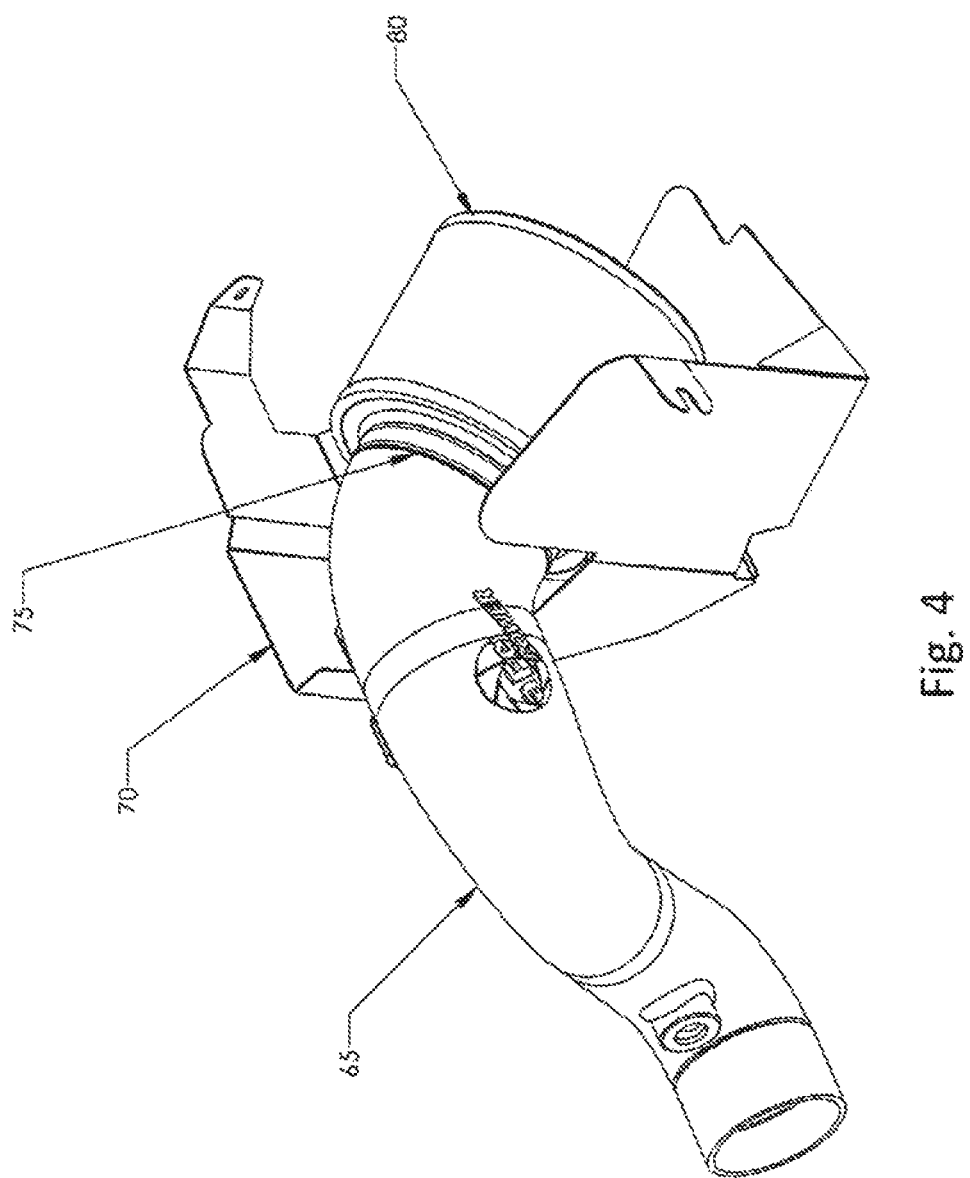
FIG. 4 is a perspective view of another air filter assembly with an open housing and having a canister type air filter.
Figure 5:
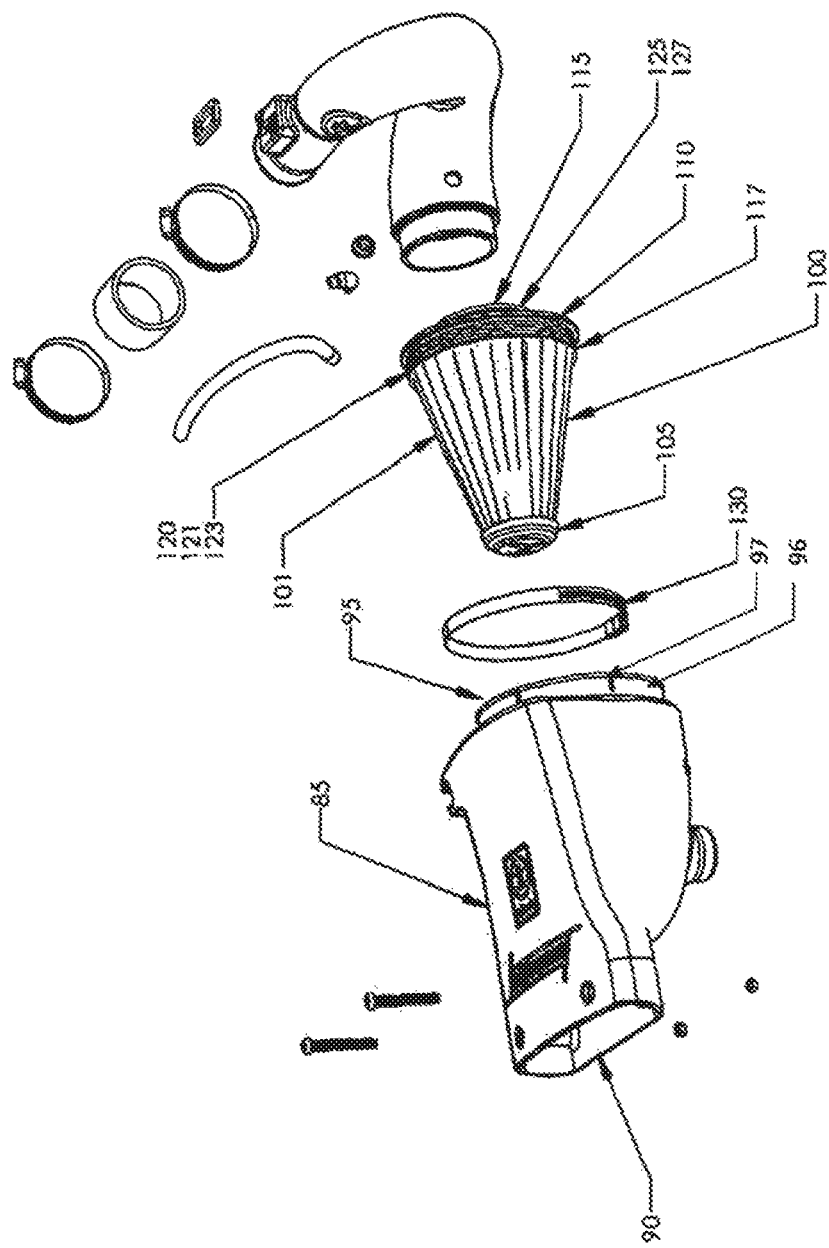
FIG. 5 is a perspective view of another air filter assembly with various elements identified.

FIG. 5 shows one embodiment of an interface air filter assembly. The housing 85 has an air intake port 90 and an opening 95. The rim 96 has an internal surface that is adapted to accommodate the external circumference 121 of the first engaging member 120 of the air filter assembly 100. When the air filter 101 is disposed within the body of the housing, a clamp 130 can be placed over the external surface of the rim 96 and the clamp 130 is used to bring the internal surface of the rim into contact with the external circumference 121 of the first engaging member 120 of the air filter assembly 100 in a substantially airtight manner. This assists to prevent leakage at the interface between the housing and the air filter. In one embodiment, slits 97 in the rim 96 can be used to make it easier for the internal surface of the rim to deform under the force of the clamp 130 to form a substantially airtight seal with the external circumference 121 of the first engaging member 120 of the air filter assembly 100. In the preferred embodiment the housing is a single piece construction. Other embodiments can include a housing made of multiple components.

The interface air filter assembly 100 includes air filter media 101 and has a closed end 105 and an open end 115. In the present embodiment, during operation the air passes in the housing 85 through opening 90, then into the filter assembly 100 through air filter 101.

Figure 6:
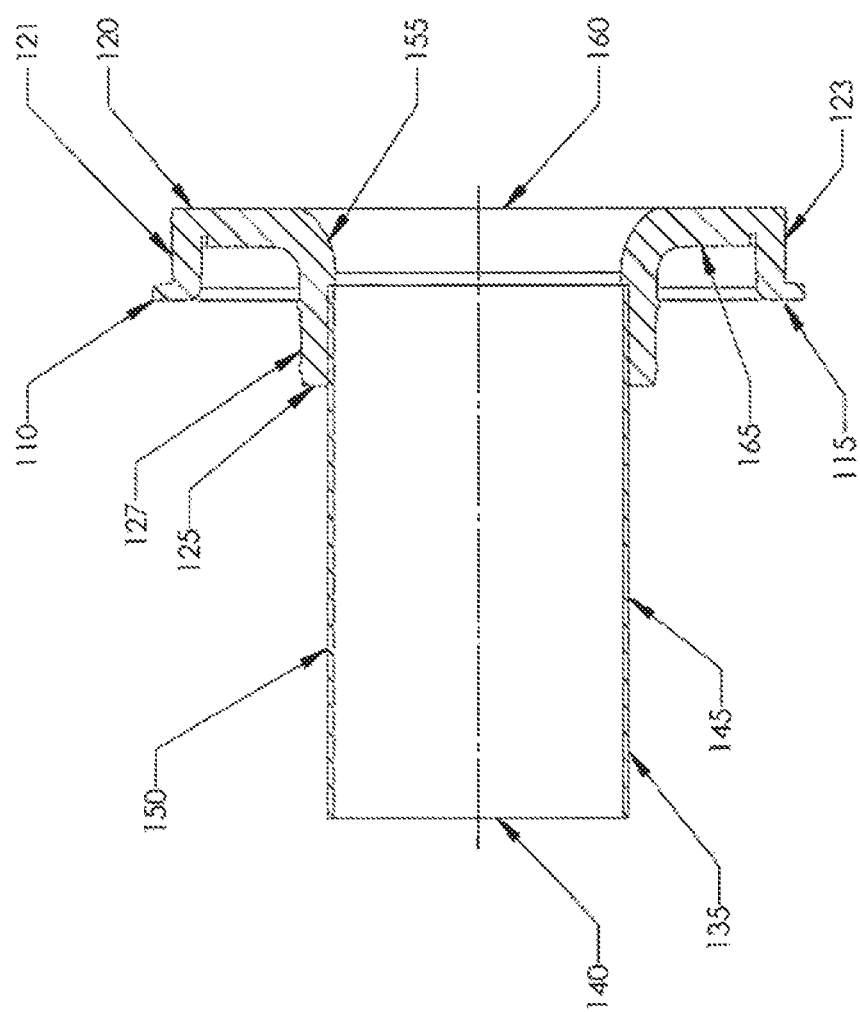
FIG. 6 is a cross sectional view of the reducing coupling.

FIG. 6 illustrates a reducing coupling 110 with a first end 117. The reducing coupling 110 has a first engaging member 120 with an external circumference 121 and an outer surface 123. The outer surface 123 can have a plurality of circumferential ridges to increase the contact effectiveness. The second end 125 of the reducing coupling 110 has a second engaging member 125 having an external circumference 127. As depicted in the figure, the external circumference 127 of the second engaging member is less than the external circumference 121 of the first engaging member.

The second engaging member 125 has an inner surface 155. The reducing coupling has a channel 160 that allows air flow.

Turning back to FIG. 5, the first end 115 of the reducing coupling is connected to the open end 110 of the air filter 101. This can include a single piece construction where the reducing coupling is permanently affixed to the air filter or multiple pieces that can comprise the air filter assembly.

In the preferred embodiment, the reducing coupling is made of a relatively flexible material. This can include rubber type materials or urethanes. In other embodiments, the reducing coupling can be comprised of a combination of more solid materials and relatively flexible materials. In one embodiment plastic could be used to connect the first engaging member to the second engaging member.

In the embodiment of FIG. 5, a clamp 130 is used to secure the first engaging member to the housing. As the clamp is applied, the outer surface 123 is securely brought into contact with the housing 85.

A clamp may also be used to secure the second engaging member 125 to an air intake tube.

While a clamp is disclosed as one way to secure the interface air filter to the housing and the air intake tube, other embodiments can include screws, snaps, or other structures to affect the same result.

In FIG. 6 a cross sectional view of the reducing coupling 110 is shown. An air intake tube 135 has a hollow center 140, a wall 145, and a surface 150. The surface 150 comes into contact with the inner surface 155 of the second engaging member 125 of the reducing coupling 110. The inner surface 155 can have a plurality of circumferential ridges to increase the contact effectiveness to the surface 150 of the air intake tube 135. The surface 155 can also include other type of surface textures to accomplish the same result and to effectuate a more air tight fit with the air intake tube 135.

In the present embodiment, there is a body 165 that connects the second engaging member 125 and the first engaging member 120. In other embodiments, the first and second engaging members may be of such dimensions as to negate the need for a body between the two.

The reducing coupling has an airway 160 so that air can traverse from the inside of the filter to the air intake tube. Furthermore, the reducing coupling is not limited to the geometry as depicted. There is also a body 165 that connects to the air intake tube 135.

While embodiments have been described in detail, it should be appreciated that various modifications and/or variations may be made without departing from the scope or spirit of the invention. In this regard it is important to note that practicing the invention is not limited to the applications described herein. Many other applications and/or alterations may be utilized provided that such other applications and/or alterations do not depart from the intended purpose of the invention. Also, features illustrated or described as part of one embodiment may be used in another embodiment to provide yet another embodiment such that the features are not limited to the embodiments described herein. Thus, it is intended that the invention cover all such embodiments and variations. Nothing in this disclosure is intended to limit the scope of the invention in any way.

What is claimed is:

1. An interface air filter and assembly for use with an internal combustion engine comprising:
    a single piece housing having an air intake port and an opening;
    an interface air filter comprising;
    an air filter having a closed end and an open end;
    a reducing coupling having a first end with a first engaging member having an external circumference and outer surface the outer surface having a plurality of ridges extending outwardly from the outer surface to engage an air intake port housing, a second end with a second engaging member having an external circumference less than the first engaging member external circumference, and the second engaging member having an inner surface to engage an outer surface of an air intake tube and the second end adapted to receive a securing clamp; and
    the air filter residing within the housing, and the first engaging member being in contact with the housing in a substantially air tight manner;
    wherein the inner surface of the second engaging member is adapted to contact an air intake tube outer surface in a substantially airtight manner.

2. The interface air filter and assembly for use with an internal combustion engine of claim 1, wherein the single piece housing is a molded structure.

3. An interface air filter and assembly for use with an internal combustion engine comprising:
    a single piece housing having an air intake port, an opening, and a rim disposed generally around the opening;

an air filter having an air filter media, a closed end, and an open end, the air filter media residing within the single piece housing;

an air intake; and a reducing coupling, the coupling being attached to the rim, the open end of the air filter, and the air intake, in a substantially airtight manner;

wherein, air can pass from the air intake port into the housing then through the air filter and into the air intake.

4. The interface air filter and assembly for use with an internal combustion engine of claim 3, wherein the single piece housing is a molded structure.

5. An interface air filter and assembly for use with an internal combustion engine comprising:

a housing having a plurality of elements, an air intake port;

an interface air filter comprising;

an air filter having a closed end and an open end;

a reducing coupling having a first end with a first engaging member having an external circumference and outer surface, the outer surface having a plurality of ridges extending outwardly from the outer surface to engage an air intake port of a housing, a second end with a second engaging member having an inner surface to engage an outer surface of an air intake tube and the second end adapted to receive a securing clamp; and the first end of the reducing coupling being configured such that the first engaging member outer surface extends outwardly from the filter; and the air filter residing within the housing, and the first engaging member being in contact with the housing in a substantially air tight manner;

wherein the inner surface of the second engaging member is configured in a substantially airtight manner so that air can pass from the air intake port into the housing then through the air filter and into the air intake tube.

6. An interface air filter and assembly for use with an internal combustion engine comprising:

a housing having a an air intake port, an opening, and a rim disposed around the opening;

an air filter having a media, a closed end, and an open end, the air filter media residing within the single piece housing;

an air intake tube; and a coupling, the coupling being attached to the rim, in a substantially airtight manner;

wherein, air can pass from the air intake port and into the air intake tube.

* * * * *